US012335597B2

(12) United States Patent
Lin et al.

(10) Patent No.: US 12,335,597 B2
(45) Date of Patent: Jun. 17, 2025

(54) SHOOTING METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Dezhao Lin, Hangzhou (CN); Qihao Yang, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 125 days.

(21) Appl. No.: 18/326,448

(22) Filed: May 31, 2023

(65) Prior Publication Data

US 2023/0308742 A1 Sep. 28, 2023

Related U.S. Application Data

(63) Continuation of application No. PCT/CN2021/134308, filed on Nov. 30, 2021.

(30) Foreign Application Priority Data

Dec. 4, 2020 (CN) ......................... 202011410508.0

(51) Int. Cl.
*H04N 23/62* (2023.01)
*H04N 23/63* (2023.01)
*H04N 23/667* (2023.01)

(52) U.S. Cl.
CPC ........... *H04N 23/62* (2023.01); *H04N 23/632* (2023.01); *H04N 23/667* (2023.01)

(58) Field of Classification Search
CPC .... H04N 23/62; H04N 23/632; H04N 23/667; H04N 23/90; H04N 23/631; H04N 23/675; H04N 23/63; H04N 23/633; G06F 3/04883
See application file for complete search history.

(56) References Cited

U.S. PATENT DOCUMENTS 11,765,463 B2 9/2023 Li et al.
2014/0092272 A1 4/2014 Choi
2014/0139721 A1 5/2014 Choi
2014/0240452 A1 8/2014 Ki et al.
(Continued)

FOREIGN PATENT DOCUMENTS

CN 104349063 A 2/2015
CN 104869304 A 8/2015
(Continued)

*Primary Examiner* — Kelly L Jerabek
(74) *Attorney, Agent, or Firm* — Price Heneveld LLP

(57) ABSTRACT

This application discloses a shooting method and apparatus, an electronic device, and a readable storage medium, and pertains to the shooting field. The method includes: displaying multiple controls in a first region of a shooting screen, where multiple cameras are configured, each of the controls corresponds to one of the cameras, and the multiple controls include a first target control; receiving a first input, where the first input is used for controlling the first target control to move to a second region of the shooting screen; and in response to the first input, focusing on a first target object indicated by the second region of the shooting screen using a camera corresponding to the first target control.

19 Claims, 14 Drawing Sheets

HDR

(56) References Cited

U.S. PATENT DOCUMENTS

2015/0172554 A1 6/2015 Adachi
2015/0244929 A1 8/2015 Lee et al.
2015/0304557 A1* 10/2015 Choi .................... H04N 5/2621 348/218.1
2017/0013179 A1* 1/2017 Kang ................... H04N 23/631
2017/0272644 A1* 9/2017 Chou ..................... H04N 7/181
2022/0159183 A1 5/2022 Li et al.

FOREIGN PATENT DOCUMENTS

CN 105120178 A 12/2015
CN 108184070 A 6/2018
CN 110072070 A 7/2019
CN 110139033 A 8/2019
CN 112511751 A 3/2021
JP 2015119338 A 6/2015
JP 2019109550 A 7/2019
JP 2020150297 A 9/2020

* cited by examiner

SHOOTING METHOD AND APPARATUS, ELECTRONIC DEVICE, AND READABLE STORAGE MEDIUM

CROSS-REFERENCE TO RELATED APPLICATIONS

The present application is a U.S. National Phase of International Application No. PCT/CN2021/134308, entitled "PHOTOGRAPHING METHOD, APPARATUS, ELECTRONIC DEVICE, AND READABLE STORAGE MEDIUM", and filed on Nov. 30, 2021. International Application No. PCT/CN2021/134308 claims priority to Chinese Patent Application No. 202011410508.0, filed in China on Dec. 4, 2020. Each of the above-listed applications is incorporated herein by reference in its entirety.

TECHNICAL FIELD

This application pertains to the photography field, and specifically, relates to a shooting method and apparatus, an electronic device, and a readable storage medium.

BACKGROUND

Currently, for all devices equipped with multiple cameras to focus in a shooting procedure, an applicable camera is first identified automatically and then a preview box is tapped. If a user needs to select another camera for shooting, the user needs to select an applicable shooting mode from a menu bar on a shooting screen, which means to select a corresponding camera. However, in each switching of shooting modes, only one type of camera can be selected for shooting. If there are multiple objects to be shot which are at different distances to the camera, only some of the objects to be shot can be brought in focus under one shooting mode. Therefore, in the prior art, changing the camera for shooting in a shooting procedure when using a multi-camera device entails complicated switching operations while the focusing effect is less desirable.

SUMMARY

According to a first aspect, an embodiment of this application provides a shooting method, including: displaying multiple controls corresponding to cameras in a first region of a shooting screen, where the cameras are provided in plurality, each of the controls corresponds to one of the cameras, and the multiple controls include a first target control; receiving a first input, where the first input is used for controlling at least one first target control to move to a second region of the shooting screen; and in response to the first input, focusing on a first shooting target object indicated by the second region of the shooting screen using a camera corresponding to the first target control.

According to a second aspect, an embodiment of this application provides a shooting apparatus, including: a first display module, configured to display multiple controls in a first region of a shooting screen, where multiple cameras are configured, each of the controls corresponds to one of the cameras, and the multiple controls include a first target control; a first receiving module, configured to receive a first input, where the first input is used for controlling the first target control to move to a second region of the shooting screen; and a first focusing module, configured to, in response to the first input, focus on a first target object indicated by the second region of the shooting screen using a camera corresponding to the first target control.

According to a third aspect, an embodiment of this application provides an electronic device, where the electronic device includes a processor, a memory, and a program or instructions stored in the memory and capable of running on the processor, and when the program or instructions are executed by the processor, the steps of the method according to the first aspect are implemented.

According to a fourth aspect, an embodiment of this application provides a readable storage medium, where the readable storage medium stores a program or instructions, and when the program or instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions so as to implement the method according to the first aspect.

According to a sixth aspect, an embodiment of this application provides a computer program product, where the computer program product is stored in a non-transitory storage medium, and the computer program product is executed by at least one processor so as to implement the method according to the first aspect.

DETAILED DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances such that the embodiments of this application can be implemented in other orders than the order illustrated or described herein. In addition, objects distinguished by "first", "second", and the like are generally of a same type, and the quantities of the objects are not limited. For example, there may be one or more first objects. In addition, "and/or" in the specification and claims represents at least one of connected objects, and the character "/" generally indicates that the associated objects have an "or" relationship.

The following describes in detail the shooting method provided in the embodiments of this application through specific embodiments and application scenarios thereof with reference to the accompanying drawings.

Figure 1:
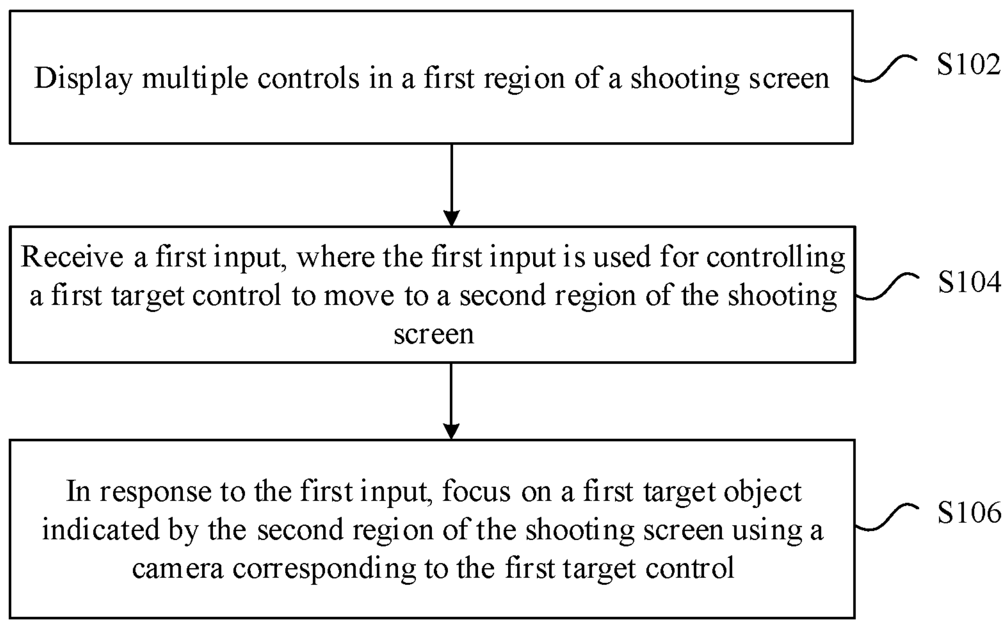
FIG. 1 is a flowchart of a shooting method according to an embodiment of this application.

Embodiments of this application provide a shooting method. FIG. 1 is a flowchart of a shooting method according to an embodiment of this application. As shown in FIG. 1, the method includes the following steps.

Step S102: Display multiple controls in a first region of a shooting screen, where multiple cameras are configured, each of the controls corresponds to one of the cameras, and the multiple controls include a first target control.

Step S104: Receive a first input, where the first input is used for controlling the first target control to move to a second region of the shooting screen.

Step S106: In response to the first input, focus on a first target object indicated by the second region of the shooting screen using a camera corresponding to the first target control.

According to the foregoing step S102 to step S106, a first input can be used to move a first target control in multiple controls displayed in a first region of a shooting screen to a second region of the shooting screen, and then a camera corresponding to the first target control is used to bring the first target object in focus. This means a camera corresponding to a control can be directly selected via an input. In the case of multiple target objects in a current shooting screen, cameras corresponding to multiple controls can be selected for respective focusing so as to implement accurate focusing on each target object without frequently switching between different shooting modes. While improving the shooting effects, this also improves user experience in shooting using a multi-camera device, thereby solving the prior-art problem of complicated switching operations and poor focusing effect in changing the camera for shooting in a shooting procedure when using a multi-camera device.

It should be understood that each camera can focus on only one target object at one time. In order to prevent a user from moving a corresponding control after having used a specific camera, optionally, after the first target control moves from the first region to the second region, the first target control disappears after the first target object in the second region is in focus. Alternatively, after the first target control moves from the first region to the second region, an icon of the first target control may be changed to be transparent and untouchable.

In an optional implementation of this embodiment of this application, the input operations involved in this embodiment of this application, such as the first input and the second input, may be different touch operations, for example, slide operations on a device screen; or they may be different tap operations, where, for example, a double-tap operation corresponds to the first input on the device screen and a three-tap operation corresponds to the second input; or the first input and the second input are determined through detection of motion tracks of the device, meaning that different motion tracks correspond to different inputs. Forms of the first input, the second input, and other subsequent inputs are not specifically limited in this application.

Figure 2:
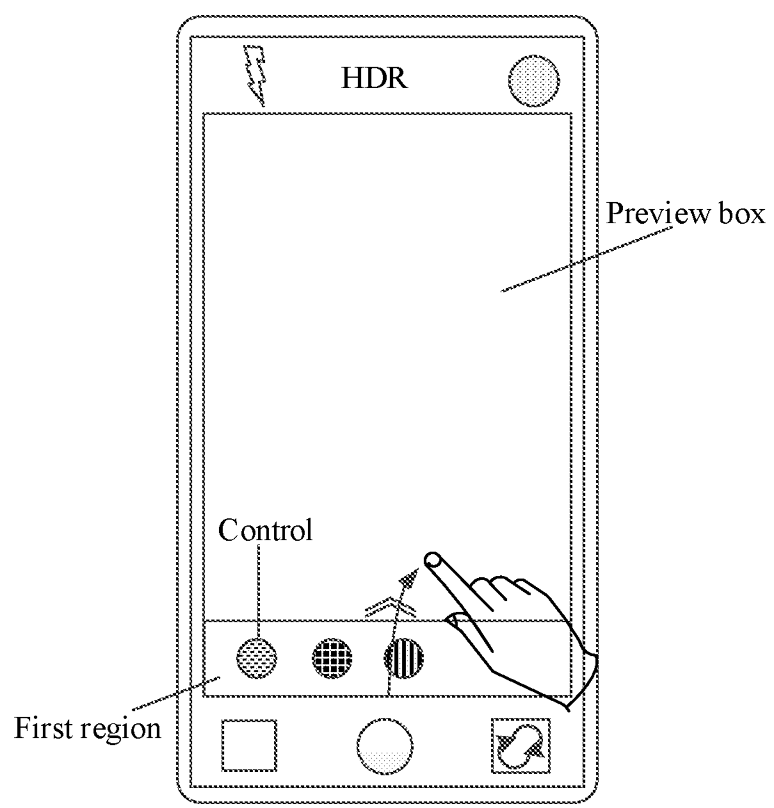
FIG. 2 is a first schematic diagram of a shooting screen in a shooting procedure according to an embodiment of this application.

In addition, in this embodiment of the application, the first region may be a fixed region arranged on the top, side, or bottom of the shooting screen or a pop-up window arranged on the top, side, or bottom of the shooting screen. This is not specifically limited in this application, and applicable arrangement can be made according to the actual situation. The second region is in a preview box of the shooting screen, and a specific position of the second region is determined by a target object to be shot, which means that the target object is in the second region. In this embodiment of this application, the first region is arranged at the bottom of the shooting screen, above the controls for shooting control. Specially, as shown in FIG. 2, different controls are represented by circles in the first region, and differently filled circles represent controls corresponding to different cameras; and below the first region are controls for the user to control the shooting, controls for switching between the front-facing and rear-facing cameras, and controls for previewing images. In FIG. 2, the first region is displayed in the form of a drawer. Certainly, the first region may alternatively be displayed in other forms. This application does not limit the form.

In an optional implementation of this embodiment of this application, the method of receiving the first input in step S104 of this application may further include:

- step S104-11: moving the first target control to the second region of the shooting screen based on the first input; or
- step S104-12: determining a corresponding first target control based on a shooting target selected by the first input, and moving the first target control from the first region to the second region.

Figure 3:
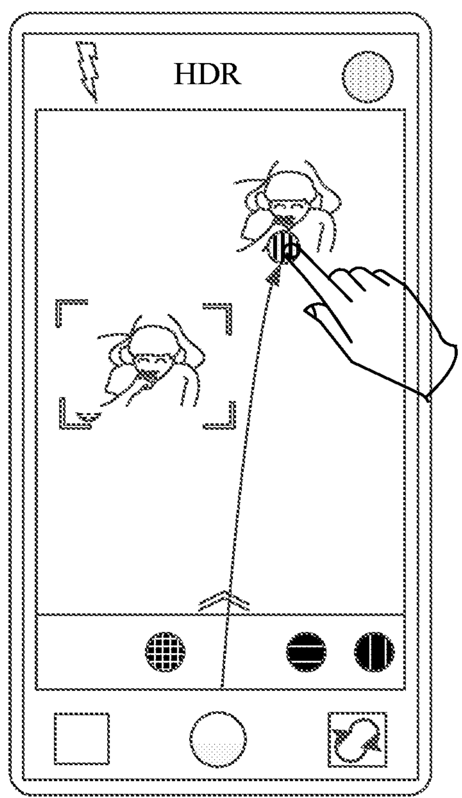
FIG. 3 is a first schematic diagram of focusing in a shooting procedure according to an embodiment of this application.
Figure 4:
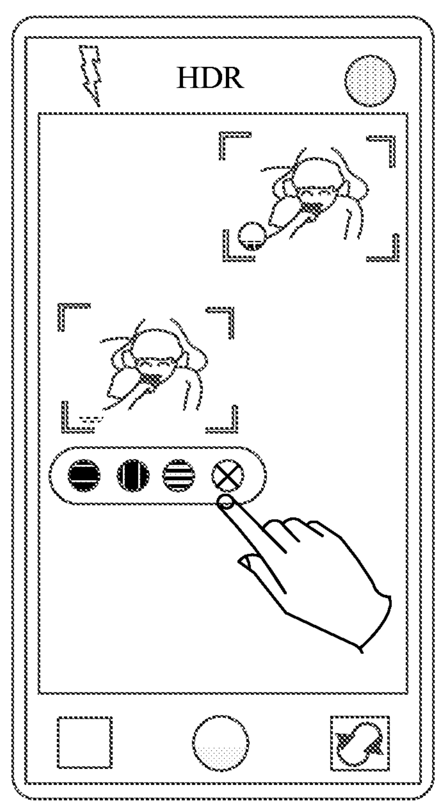
FIG. 4 is a second schematic diagram of focusing in a shooting procedure according to an embodiment of this application.

It can be learned from the foregoing steps S104-11 and S104-12 that in this embodiment of this application, for step S104-11, if the first input is a slide operation, as shown in FIG. 3, the first target control can be slid to the second region via a slide operation, which means that a corresponding control can be selected to focus on a corresponding target object via a slide operation. The first region in the foregoing step S104-11 may alternatively be below a specific shooting target, as shown in FIG. 4. Based on a move instruction corresponding to a touch operation (first input) sensed by the device, the first target control can be moved from the first region to the second region, where the first target control may be any control in the first region, and the control with "x" in FIG. 4 is provided for canceling a focusing operation. Certainly, in other application scenarios, other methods may be used to cancel a focusing operation. The foregoing method in FIG. 4 is merely an example.

Figure 5:
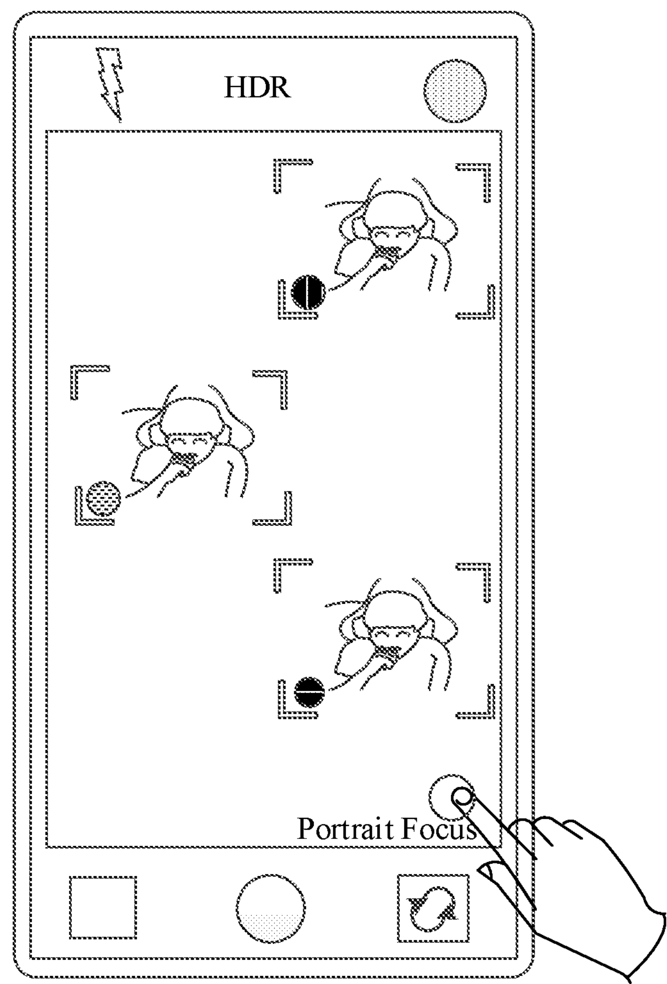
FIG. 5 is a third schematic diagram of focusing in a shooting procedure according to an embodiment of this application.

For step S104-12, as shown in FIG. 5, automatic focusing is implemented by tapping a target button 'Portrait Focus' on the shooting screen, which means that different objects can be brought in focus using cameras corresponding to different controls without manually selecting the corresponding controls before focusing. However, no matter which method is used, different cameras can be used to focus on different target objects in the shooting screen, such that precise focusing can be implemented for every target object.

In an optional implementation of this embodiment of this application, after the focusing on a first target object indicated by the second region of the shooting screen using a camera corresponding to the first target control, the method of this embodiment of this application further includes:

step S108: displaying the first target control transparently in the second region after the first target object is in focus.

Figure 6:
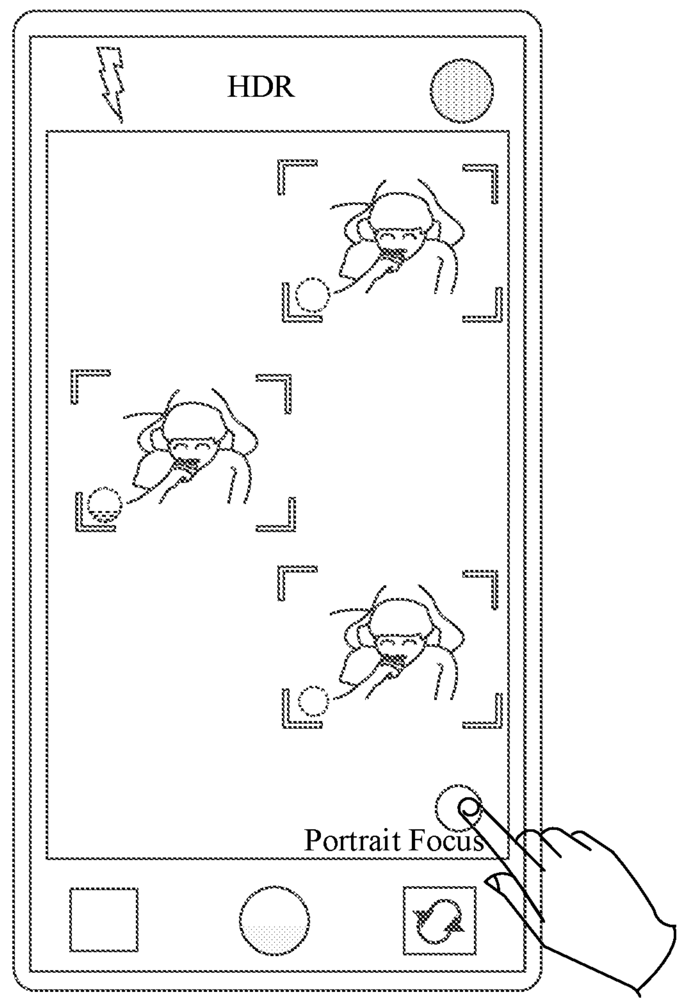
FIG. 6 is a fourth schematic diagram of focusing in a shooting procedure according to an embodiment of this application.

It can be learned that if focusing is done for a shooting target, the target control is transparently displayed in the shooting screen. As shown in FIG. 6, three target objects in the preview box of the shooting screen have all been in focus, and their corresponding controls are displayed in a transparent manner in regions in which the target objects are located, where the transparency of the controls can be set as required or configured by default. By displaying controls in a transparent manner, users can more easily identify which shooting targets have been in focus. In addition, focusing-done controls do not coincide in position with the shooting targets in this application, which means that the focusing-done controls are transparently displayed around the shooting targets without blocking the shooting targets for the ease of determining focusing effects of the camera on the target objects.

In this embodiment of this application, after the step S106 of focusing on a first target object indicated by the second region of the shooting screen using a camera corresponding to the first target control, the steps of the method of this embodiment of this application further include:

step S110: receiving a second input, where the second input is used for canceling a focus lock of a camera corresponding to the first target control to the first target object; and step S112: switching the first target control back to the first region in response to the second input.

Figure 7:
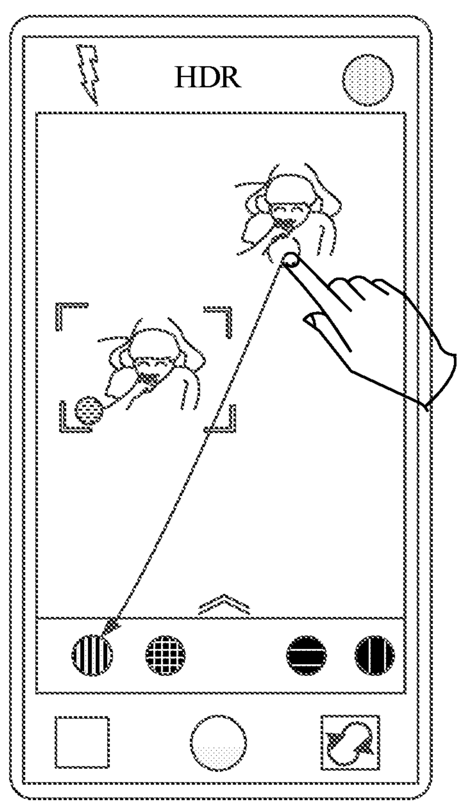
FIG. 7 is a fifth schematic diagram of focusing in a shooting procedure according to an embodiment of this application.

The second input in the foregoing step S110 and step S112, in specific application scenarios, may be a double-tap operation or a touch-and-hold operation for canceling the focusing operation. In a specific application scenario, as shown in FIG. 7, after a control corresponding to an in-focus shooting target in the upper right corner of the preview box of the shooting screen is double tapped, the focusing on the shooting target in the upper right corner is canceled, and the first target control automatically switches back to the first region after moved out of a region in which the target object is located. The switching back to the first region may be switching the first target control back to its original position, or switching the first target control back to a forward empty position in the first region. For example, in the case that rightward means backward, the first target control switches back to the empty position on the left of the first region.

In another optional implementation of this embodiment of this application, after the step S106 of focusing on a first target object indicated by the second region of the shooting screen using a camera corresponding to the first target control, the method of this embodiment of this application further includes:

step S114: receiving a third input, where the third input is used for controlling the first target control to slide into a third region of the shooting screen; and step S116: in response to the third input, focusing on a second target object indicated by the third region of the shooting screen using a camera corresponding to the first target control.

Figure 8:
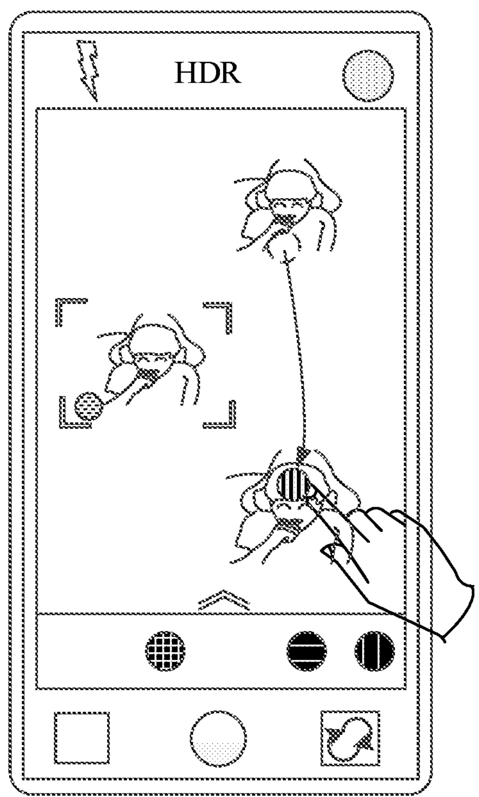
FIG. 8 is a sixth schematic diagram of focusing in a shooting procedure according to an embodiment of this application.

According to the foregoing step S114 and step S116, if the current focusing effect is not ideal, it perhaps means that the focusing camera currently selected is not suitable. In this case, a correspondence between controls and target objects can be adjusted, so the control corresponding to the target object can be moved to a region of another target object to focus on the another target object. For example, as shown in FIG. 8, if the control used for focusing on the first target object corresponds to a long-focus camera, and after the focusing is completed, it is found that the long-focus camera is not suitable for the first target object, the first target control can be moved to another region (the third region) to focus on the target object in the third region, achieving adjustment of an object for focusing by a camera corresponding to control.

In another optional implementation of this embodiment of this application, after the step S106 in this application of focusing on a first target object indicated by the second region of the shooting screen using a camera corresponding to the first target control, the method of this embodiment of this application further includes:

step S118: receiving a fourth input, where the fourth input is used for controlling the first target control in the second region to switch positions with the second target control in the fourth region; and step S120: in response to the fourth input, focusing on a third target object indicated by the fourth region using a camera corresponding to the first target control, and focusing on the first target object using a camera corresponding to the second target control.

Figure 9:
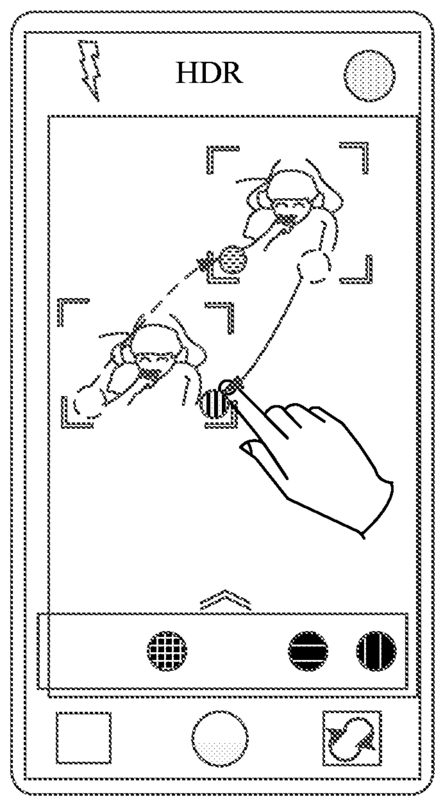
FIG. 9 is a seventh schematic diagram of focusing in a shooting procedure according to an embodiment of this application.

Based on the foregoing step S118 and step S120, if the current focusing effect is not ideal, it indicates that the focusing camera currently selected may not be suitable, a correspondence between the control and the target object can be adjusted, in other words, the control corresponding to the target object can be moved to a region of another target object so as to focus on the another target object. For example, as shown in FIG. 9, if the control used for focusing on the first target object corresponds to a long-focus camera, the control used for focusing on the second target object corresponds to a short-focus camera, and after the focusing is completed, it is found that the long-focus camera is not suitable for the first target object but suitable for the second target object, which also indicates that the short-focus camera is not suitable for the second target object, the focusing on the first target object can be canceled, and then the control corresponding to the long-focus camera can be moved to the region in which the second target object is located, or the focusing on the second target object can be canceled, and then the control corresponding to the short-focus camera moves to the region in which the first target object is located. Specifically, after the two controls coincide, the control unmoved automatically moves to the region in which the control moved is located for focusing, and the control moved stays in the current region for focusing.

In another optional implementation of this embodiment of this application, after the step S106 in this application of focusing on a first target object indicated by the second region of the shooting screen using a camera corresponding to the first target control, the method of this embodiment of this application further includes:

step S122: receiving a fifth input, where the fifth input is used for controlling a third target control in controls displayed in the first region to switch positions with the first target control in the second region; and step S124: in response to the fifth input, focusing on the first target object using a camera corresponding to the third target control.

With step S122 and step S124 of this embodiment of this application, after receipt of the fifth input, the controls in the first region and the second region can be exchanged. For example, after a control in the second region is selected, the control in the second region is dragged into the first region to cover a control to be replaced, then the control in the first region automatically moves to the second region to focus on the target object therein, and the control in the second region is displayed in the first region.

In another optional implementation of this embodiment of this application, after the step S106 in this application of focusing on a first target object indicated by the second region of the shooting screen using a camera corresponding to the first target control, the method of this embodiment of this application further includes:

step S126: after all target objects in the shooting screen are in focus, displaying a focusing result as a preview on the shooting screen, where no controls are displayed in the focusing result.

After all the target objects are in focus, display effects of the target objects in focus can be presented in the preview box, but with no controls displayed in the focusing result. This is to avoid the influence of the controls on the display effects of the target objects.

In an optional implementation of this embodiment of this application, after the displaying multiple controls in a first region of a shooting screen, the steps of the method of the embodiment of this application may further include:

step S128: receiving a sixth input, where the sixth input is used for controlling the controls in the first region to slide in a first direction so as to display a hidden control.

Figure 10:
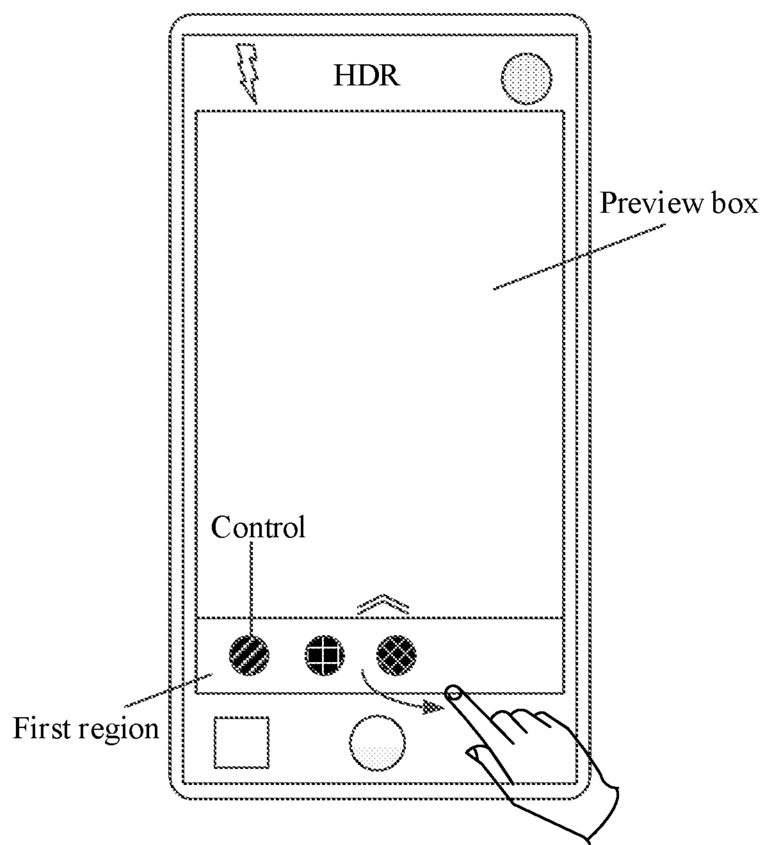
FIG. 10 is a second schematic diagram of a shooting screen in a shooting procedure according to an embodiment of this application.

If the device has many cameras, there are many corresponding controls, and if there are too many controls for the current display region to show all of them, some controls need to be hidden. According to the foregoing step S128, a sixth input (for example, slide operation) can be used to display via a slide operation some controls that are hidden in the first region. As shown in FIG. 10, in response to the sixth input of rightward sliding, corresponding controls are displayed, and in turn the controls previously displayed can be hidden. Certainly, hidden controls can alternatively be displayed via a leftward slide, that is, in the first direction of this embodiment of this application. No specific direction is defined herein, and multiple directions may apply.

In an optional implementation of this embodiment of this application, after the displaying multiple controls in a first region of a shooting screen, the steps of the method of the embodiment of this application may further include:

step S130: receiving a seventh input, where the seventh input is used for controlling the first region to expand in the second direction to display the multiple controls and to display text information corresponding to the multiple controls.

Figure 11:
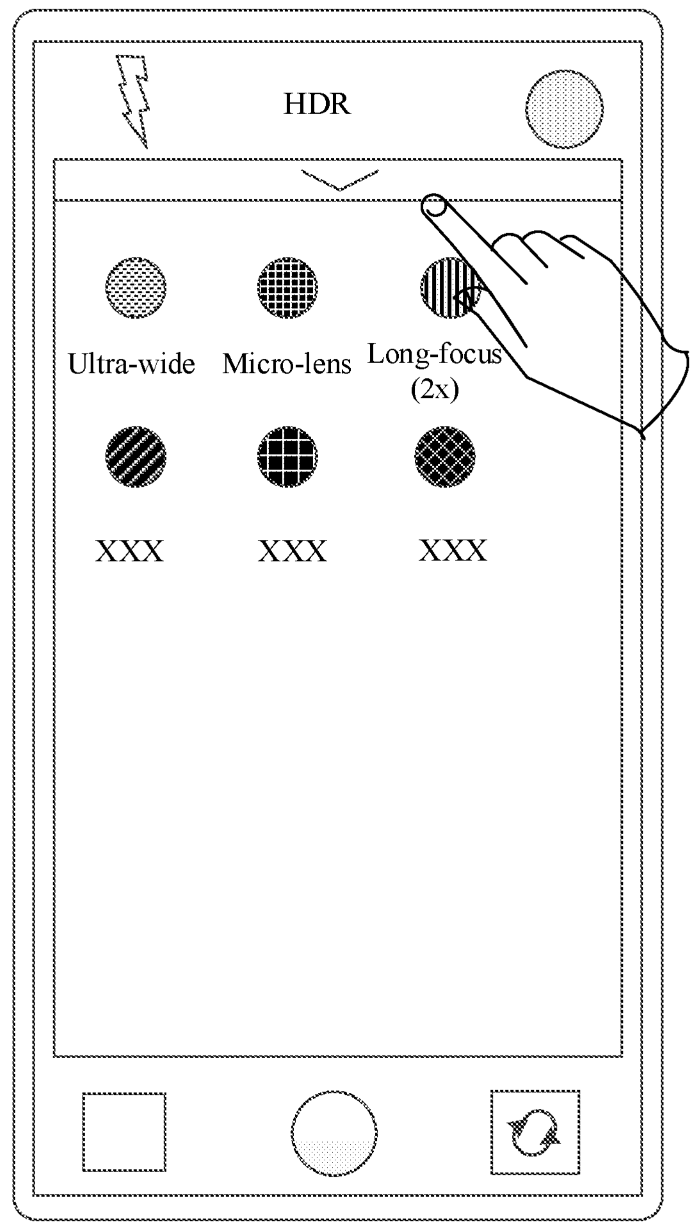
FIG. 11 is a third schematic diagram of a shooting screen in a shooting procedure according to an embodiment of this application.

In order to make the user understand the function of each control more clearly, in response to the seventh input, the multiple controls in the first region can be expanded and their corresponding text information is also displayed, where the text information is used to describe the function of the corresponding control. In a specific application scenario, as shown in FIG. 11, the drawer can be pulled out completely by tapping the "arrow" above the drawer. In this case, all cameras are displayed, and corresponding camera descriptions are displayed below camera icons, allowing users to easily and clearly understand the cameras corresponding to different icons. The drawer is automatically drawn back by tapping the "arrow" again.

The following describes, with examples, this application with reference to specific implementations of the embodiments of this application.

Figure 12:
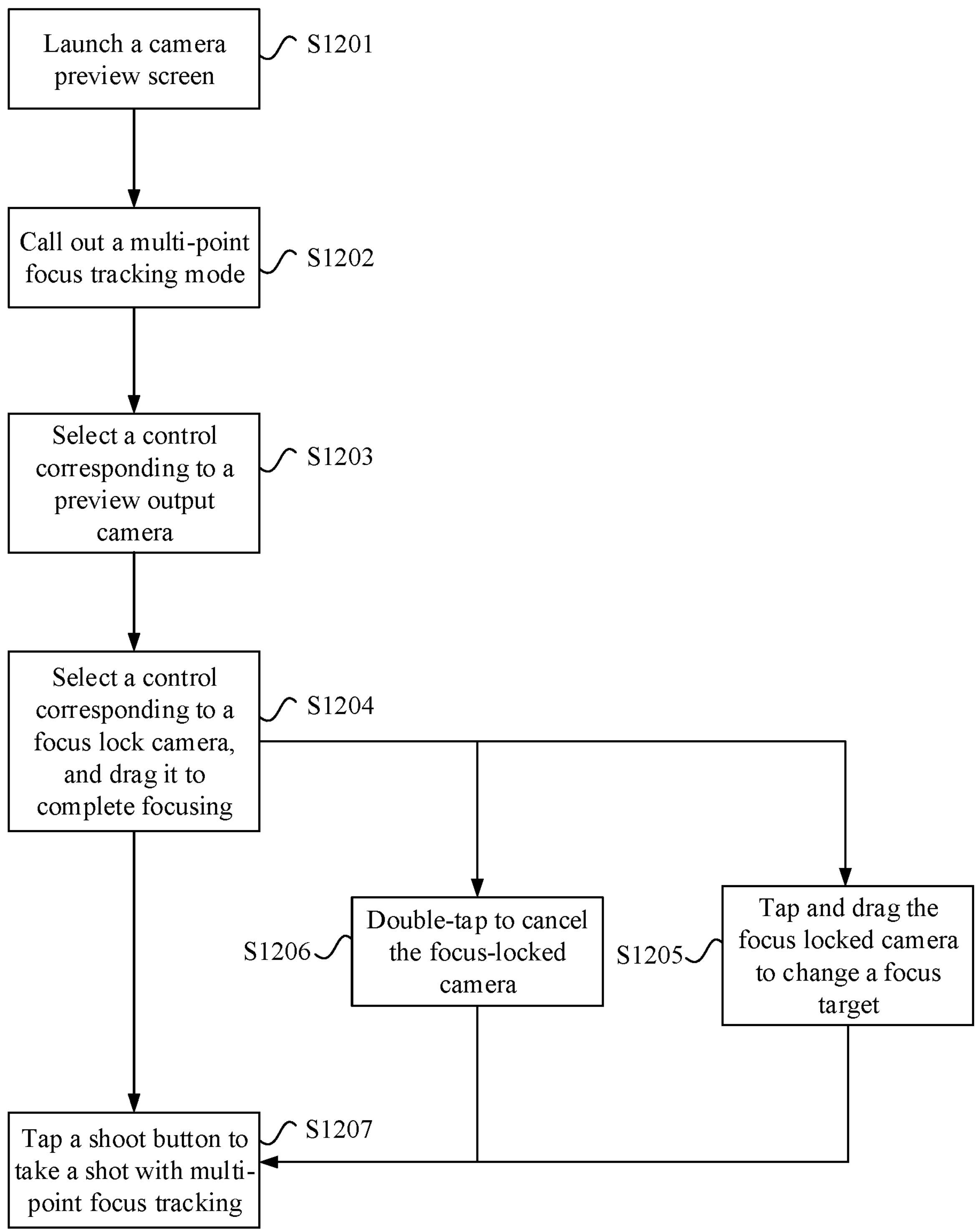
FIG. 12 is a flowchart of a method for controlling multiple cameras to perform focus tracking and shooting according to an embodiment of this application.

This specific implementation provides, based on an array camera, a method for controlling multiple cameras to perform focus tracking for shooting in the case of multiple cameras. As shown in FIG. 12, the method includes the following steps.

Step S1201. Launch a camera shooting preview screen.

Step S1202: Call out a multi-point focus tracking mode on the preview screen.

As shown in FIG. 2, on the camera preview screen, a drawer in which the cameras are located (for the foregoing first region) is slid upwards from a preview box, the camera drawer including all cameras in the array available for selection by the user. In addition, the camera drawer can be drawn out by a slight upward slide from the bottom of the preview box, and likewise the camera drawer can be retracted by a downward slide.

As shown in FIG. 10, if there are too many cameras, a user can press and hold the camera drawer to slide left and right to swap pages so as to select more controls corresponding to the cameras. Through page swapping, more controls corresponding to different cameras can be displayed for selection by the user.

As shown in FIG. 11, a user can press and hold the upward "small arrow" to draw out the drawer completely. In this case, controls corresponding to all cameras are displayed with corresponding camera descriptions below the control icons, allowing users to easily and clearly understand the cameras corresponding to different icons. A camera outputting a current preview image is displayed on the upper right of the preview box. On this screen, a tap may be used to select a camera outputting the preview image, or a touch-and-hold on an icon may be used to select a camera for focus lock. After the camera is selected, the drawer retracts automatically so that the user can select a focus target on the preview screen.

Step S1203: Tap to swap a preview camera.

For the step S1203, a different camera may be selected as the camera outputting the preview screen by tapping a camera in the drawer.

Step S1204: Press and hold a camera to be selected and drag it to a target to complete focusing.

After the camera drawer is drawn out, the user can select a control corresponding to any camera, press and drag it to the focus target in the preview screen (which corresponds to the first input mentioned above), and after the user releases the control, the camera enters a locked state, indicating that the corresponding target is locked for focus tracking. The camera locked is translucent and displayed in the lower left corner of the locked target so as to avoid blocking the screen and affecting user experience in preview. In addition, the device identifies and tracks the focus-locked target through image recognition technology, such that a focal point of each selected camera remains on its focus target until the focus target leaves the screen.

To change the focus-locked target of the camera, step S1205 is performed; or to cancel the focus-locked target of the camera, step S1206 is performed; and when the user has completed the focus lock of the camera with no desire to change again, step S1207 is performed as a shooting procedure.

Step S1205: Tap the camera icon locked, and drag it again to select a new focus target.

If the user wants to change the focus target, the user can tap the icon that has become transparent (meaning the camera is focus-locked) to unlock it so that it is available for selection. This is done, the icon ceases to be translucent. The user needs to hold down the camera icon again and drag it to a new target to complete the focus lock. As shown in FIG. 8, in the case of multiple focus-locked targets, the user can directly move a camera icon to a locked target to quickly exchange the focusing cameras corresponding to the two locked targets; and after this is done, continues to perform step S1207.

Step S1206: Double-tap the camera icon locked to cancel the focus lock.

As shown in FIG. 7, if the user does not want to use a camera to focus on the target, the user may double-tap the corresponding transparent icon (meaning the camera is focus-locked) to unlock it, and in this case the camera icon returns to the drawer; and after this is done, continues to perform step S1207.

Step S1207: After the user has completed the focus lock of the cameras, the user can tap a shoot button to take a shot.

After the user has completed the focus lock of the cameras, the user can tap the shoot button to complete the shooting, and get a clear picture with single-point focusing of multiple cameras. The icons on the photo preview box are still retained for the user to continue to perform the next multi-camera single-point focus tracking.

It can be seen that the multi-camera single-point focus tracking method provided in the specific implementation of this embodiment of this application can allow the user to customize focus targets and take pictures with clear distant and near scenes or other pictures with focusing of multiple cameras at the same time, improving quality of shots of the mobile phone and providing good user experience in shooting.

It should be noted that the shooting method according to this embodiment of this application may be executed by a shooting apparatus or a control module for executing the shooting method in the shooting apparatus. In embodiments of this application, the shooting method being executed by the shooting apparatus is used as an example to describe the shooting method according to the embodiments of this application.

Figure 13:
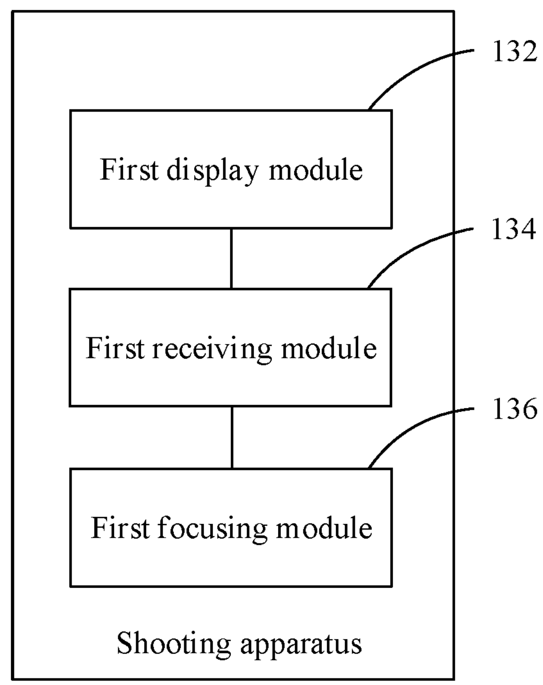
FIG. 13 is a schematic diagram of a structure of a shooting apparatus according to an embodiment of this application.

An embodiment of this application further provides a shooting apparatus. FIG. 13 is a schematic structural diagram of a shooting apparatus according to an embodiment of this application. As shown in FIG. 13, the apparatus includes:

a first display module 132, configured to display multiple controls in a first region of a shooting screen, where multiple cameras are configured, each of the controls corresponds to one of the cameras, and the multiple controls include a first target control;

a first receiving module 134, configured to receive a first input, where the first input is used for controlling the first target control to move to a second region of the shooting screen; and a first focusing module 136, configured to, in response to the first input, focus on a first target object indicated by the second region of the shooting screen using a camera corresponding to the first target control.

Optionally, the first receiving module 134 in this embodiment of this application may further include: a first receiving unit, configured to move the first target control to the second region of the shooting screen based on the first input; or a second receiving unit, configured to determine a corresponding first target control based on a shooting target selected by the first input, and move the first target control from the first region to the second region.

Optionally, the apparatus in this embodiment of this application may further include a second display module configured to, after the focusing on a first target object indicated by the second region of the shooting screen using a camera corresponding to the first target control, display the first target control transparently in the second region after the first target object is in focus.

Optionally, the apparatus in this embodiment of this application may further include: a second receiving module, configured to, after the focusing on a first target object indicated by the second region of the shooting screen using a camera corresponding to the first target control, receive a second input, where the second input is used for canceling focus lock of the camera corresponding to the first target control on the first target object; and a switching back module, configured to, in response to the second input, switch the first target control back to the first region.

Optionally, the apparatus in this embodiment of this application may further include: a third receiving module, configured to, after the focusing on a first target object indicated by the second region of the shooting screen using a camera corresponding to the first target control, receive a third input, where the third input is used for controlling the first target control to slide into a third region of the shooting screen; and a second focusing module, configured to, in response to the third input, focus on the second target object indicated by the third region of the shooting screen through the camera corresponding to the first target control.

Optionally, the apparatus in this embodiment of this application may further include: a fourth receiving module, configured to, after the focusing on a first target object indicated by the second region of the shooting screen using a camera corresponding to the first target control, receive a fourth input, where the fourth input is used for controlling the first target control in the second region to switch positions with a second target control in a fourth region; and a third focusing module, configured to, in response to the fourth input, focus on the third target object indicated by the fourth region through the camera corresponding to the first target control, and focus on the first target object using a camera corresponding to the second target control.

Optionally, the apparatus in this embodiment of this application may further include: a fifth receiving module, configured to, after the focusing on a first target object indicated by the second region of the shooting screen using a camera corresponding to the first target control, receive a fifth input, where the fifth input is used for controlling a third target control in controls displayed in the first region to switch positions with the first target control in the second region; and a fourth focusing module, configured to, in response to the fifth input, focus on the first target object using a camera corresponding to the third target control.

Optionally, the apparatus in this embodiment of this application may further include a third display module configured to, after the focusing on a first target object indicated by the second region of the shooting screen using a camera corresponding to the target control, display focusing results in a preview manner in the shooting screen after all target objects are focused.

According to the shooting apparatus of embodiments of this application, a first input can be used to move a first target control in multiple controls displayed in a first region of a shooting screen to a second region of the shooting screen, and then a camera corresponding to the first target control is used to bring the first target object in focus. This means a camera corresponding to a control can be directly selected via an input. In the case of multiple target objects in a current shooting screen, cameras corresponding to multiple controls can be selected for respective focusing so as to implement accurate focusing on each target object without frequently switching between different shooting modes. While improving the shooting effects, this also improves user experience in shooting using a multi-camera device, thereby solving the prior-art problem of complicated switching operations and poor focusing effect in changing the camera for shooting in a shooting procedure when using a multi-camera device.

The shooting apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The shooting apparatus in this embodiment of this application may be an apparatus having an operating system. The operating system may be an android operating system, may be an iOS operating system, or may be another possible operating system. This is not specifically limited in the embodiments of this application.

The shooting apparatus provided in this embodiment of this application can implement the processes implemented in the method embodiment in FIG. 1. To avoid repetition, details are not described herein again.

Figure 14:
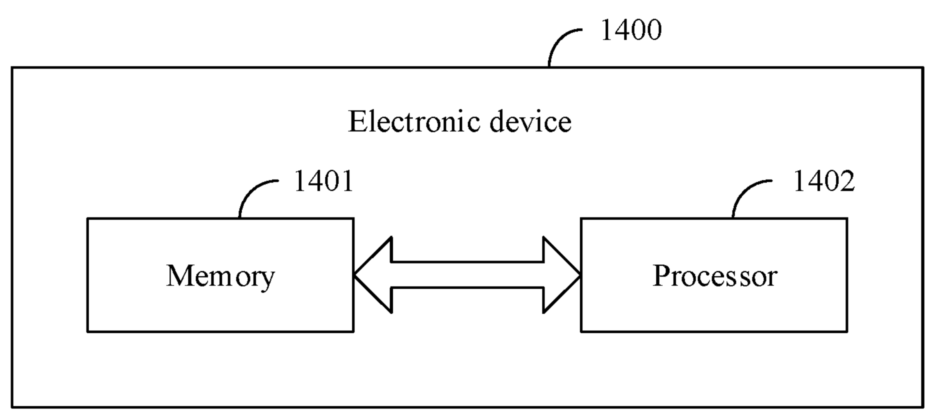
FIG. 14 is a first schematic diagram of a hardware structure of an electronic device according to an embodiment of this application.

Optionally, as shown in FIG. 14, an embodiment of this application further provides an electronic device 1400, including a processor 1402, a memory 1401, and a program or instructions stored in the memory 1401 and capable of running on the processor 1402, where when the program or instructions are executed by the processor 1402, the processes of the foregoing shooting method embodiment are implemented, with the same technical effects achieved. To avoid repetition, details are not further described herein.

It should be noted that the electronic device in this embodiment of this application includes the above-mentioned mobile electronic device and non-mobile electronic device.

Figure 15:
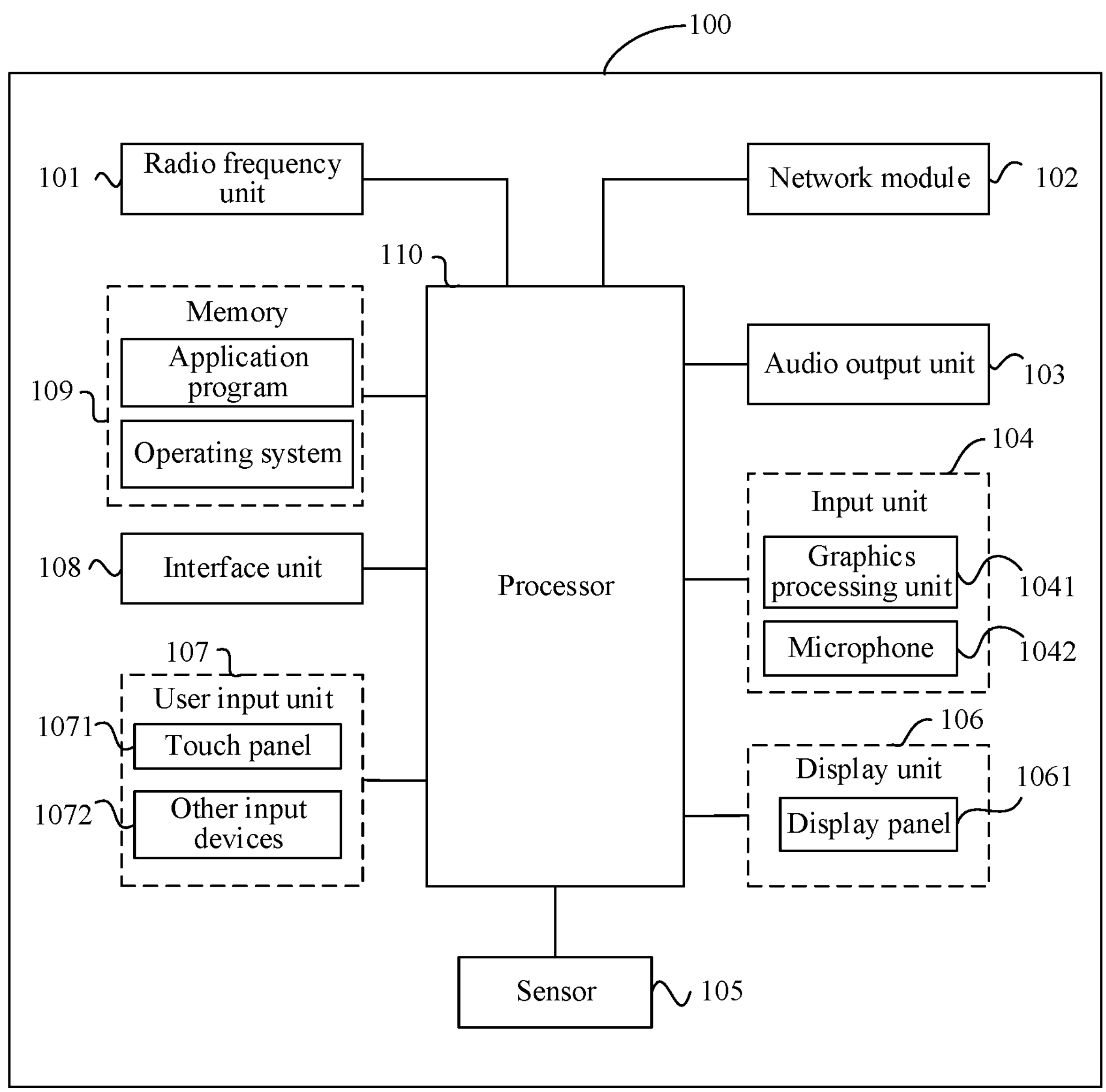
FIG. 15 is a second schematic diagram of a hardware structure of an electronic device according to an embodiment of this application.

FIG. 15 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It can be understood by those skilled in the art that the electronic device 100 may further include a power supply (for example, a battery) supplying power to the components. The power supply may be logically connected to the processor 110 via a power management system, so that functions such as charge management, discharge management, and power consumption management are implemented via the power management system. The structure of the electronic device shown in FIG. 15 does not constitute a limitation on the electronic device. The electronic device may include more or fewer components than shown in FIG. 15, or combine some of the components, or arrange the components differently. Details are not described herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in an image capture mode or a video capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a functional button (such as a volume control button or a power on/off button), a trackball, a mouse, and a joystick. Details are not described herein again. The memory 109 may be configured to store software programs and various data, including but not limited to application programs and operating systems. The processor 110 may integrate an application processor and a modem processor. The application processor mainly processes the operating system, a user interface, an application program, and the like. The modem processor mainly processes wireless communication. It can be understood that the modem processor may alternatively be not integrated in the processor 110.

An embodiment of this application further provide a readable storage medium, where the readable storage medium stores a program or instructions, and when the program or instructions are executed by a processor, the processes of the foregoing shooting method embodiments are implemented, with the same technical effects achieved. To avoid repetition, details are not described herein again.

The processor is the processor in the electronic device in the foregoing embodiments. The readable storage medium includes a computer-readable storage medium, such as a computer read-only memory (ROM), a random access memory (RAM), a magnetic disk, or an optical disc.

Another embodiment of this application provides a chip, where the chip includes a processor and a communications interface, the communications interface is coupled to the processor, and the processor is configured to run a program or instructions to implement the processes of the foregoing shooting method embodiments, with the same technical effects achieved. To avoid repetition, details are not described herein again.

It should be understood that the chip in the embodiments of this application may also be referred to as a system-level chip, a system chip, a chip system, a system on chip, or the like.

An embodiment of this application further provide a computer program product, where the computer program product is stored in a non-transitory storage medium, and when the computer program product is executed by at least one processor so as to implement the steps of the foregoing shooting method embodiment, with the same technical effects achieved. To avoid repetition, details are not described herein again.

It should be noted that in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A shooting method, comprising:

displaying multiple controls in a first region of a shooting screen, wherein multiple cameras are configured, each of the controls corresponds to one of the cameras, and the multiple controls comprise a first target control;

receiving a first input, wherein the first input is used for controlling the first target control to move to a second region of the shooting screen; and in response to the first input, focusing on a first target object indicated by the second region of the shooting screen using a camera corresponding to the first target control;

wherein the second region comprises multiple target objects, and different target objects are focused using different camera corresponding to different controls.

2. The method according to claim 1, wherein after the focusing on a first target object indicated by the second region of the shooting screen using a camera corresponding to the first target control, the method further comprises:

displaying the first target control transparently in the second region after the first target object is in focus.

3. The method according to claim 1, wherein after the focusing on a first target object indicated by the second region of the shooting screen using a camera corresponding to the first target control, the method further comprises:

receiving a second input, wherein the second input is used for canceling a focus lock of a camera corresponding to the first target control to the first target object; and switching the first target control back to the first region in response to the second input.

4. The method according to claim 1, wherein after the focusing on a first target object indicated by the second region of the shooting screen using a camera corresponding to the first target control, the method further comprises:

receiving a third input, wherein the third input is used for controlling the first target control to slide into a third region of the shooting screen; and in response to the third input, focusing on a second target object indicated by the third region of the shooting screen using a camera corresponding to the first target control.

5. The method according to claim 1, wherein after the focusing on a first target object indicated by the second region of the shooting screen using a camera corresponding to the first target control, the method further comprises:

receiving a fourth input, wherein the fourth input is used for controlling the first target control in the second region to switch positions with the second target control in the fourth region; and in response to the fourth input, focusing on a third target object indicated by the fourth region using a camera corresponding to the first target control, and focusing on the first target object using a camera corresponding to the second target control.

6. The method according to claim 1, wherein after the focusing on a first target object indicated by the second region of the shooting screen using a camera corresponding to the first target control, the method further comprises:

receiving a fifth input, wherein the fifth input is used for controlling a third target control in controls displayed in the first region to switch positions with the first target control in the second region; and in response to the fifth input, focusing on the first target object using a camera corresponding to the third target control.

7. A chip, comprising a processor and a communications interface, wherein the communications interface is coupled to a processor, and the processor is configured to run a program or instructions to implement the shooting method according to claim 1.

8. An electronic device, comprising a processor, a memory, and a program or instructions stored in the memory and capable of running on the processor, wherein the program or instructions are executed by the processor to implement the following steps:

displaying multiple controls in a first region of a shooting screen, wherein multiple cameras are configured, each of the controls corresponds to one of the cameras, and the multiple controls comprise a first target control;

receiving a first input, wherein the first input is used for controlling the first target control to move to a second region of the shooting screen; and in response to the first input, focusing on a first target object indicated by the second region of the shooting screen using a camera corresponding to the first target control;

wherein the second region comprises multiple target objects, and different target objects are focused using different camera corresponding to different controls.

9. The electronic device according to claim 8, wherein the program or instructions are further executed by the processor to implement the following step:

displaying the first target control transparently in the second region after the first target object is in focus.

10. The electronic device according to claim 8, wherein the program or instructions are further executed by the processor to implement the following steps:

receiving a second input, wherein the second input is used for canceling a focus lock of a camera corresponding to the first target control to the first target object; and switching the first target control back to the first region in response to the second input.

11. The electronic device according to claim 8, wherein the program or instructions are further executed by the processor to implement the following steps:

receiving a third input, wherein the third input is used for controlling the first target control to slide into a third region of the shooting screen; and in response to the third input, focusing on a second target object indicated by the third region of the shooting screen using a camera corresponding to the first target control.

12. The electronic device according to claim 8, wherein the program or instructions are further executed by the processor to implement the following steps:

receiving a fourth input, wherein the fourth input is used for controlling the first target control in the second region to switch positions with the second target control in the fourth region; and in response to the fourth input, focusing on a third target object indicated by the fourth region using a camera corresponding to the first target control, and focusing on the first target object using a camera corresponding to the second target control.

13. The electronic device according to claim 8, wherein the program or instructions are further executed by the processor to implement the following steps:

receiving a fifth input, wherein the fifth input is used for controlling a third target control in controls displayed in the first region to switch positions with the first target control in the second region; and in response to the fifth input, focusing on the first target object using a camera corresponding to the third target control.

14. A non-transitory readable storage medium, wherein the non-transitory readable storage medium stores a program or instructions, and the program or instructions are executed by a processor to implement the following steps:

displaying multiple controls in a first region of a shooting screen, wherein multiple cameras are configured, each of the controls corresponds to one of the cameras, and the multiple controls comprise a first target control;

receiving a first input, wherein the first input is used for controlling the first target control to move to a second region of the shooting screen; and in response to the first input, focusing on a first target object indicated by the second region of the shooting screen using a camera corresponding to the first target control;

wherein the second region comprises multiple target objects, and different target objects are focused using different camera corresponding to different controls.

15. The non-transitory readable storage medium according to claim 14, wherein the program or instructions are further executed by the processor to implement the following step:

displaying the first target control transparently in the second region after the first target object is in focus.

16. The non-transitory readable storage medium according to claim 14, wherein the program or instructions are further executed by the processor to implement the following steps:

receiving a second input, wherein the second input is used for canceling a focus lock of a camera corresponding to the first target control to the first target object; and switching the first target control back to the first region in response to the second input.

17. The non-transitory readable storage medium according to claim 14, wherein the program or instructions are further executed by the processor to implement the following steps:

receiving a third input, wherein the third input is used for controlling the first target control to slide into a third region of the shooting screen; and in response to the third input, focusing on a second target object indicated by the third region of the shooting screen using a camera corresponding to the first target control.

18. The non-transitory readable storage medium according to claim 14, wherein the program or instructions are further executed by the processor to implement the following steps:

receiving a fourth input, wherein the fourth input is used for controlling the first target control in the second region to switch positions with the second target control in the fourth region; and in response to the fourth input, focusing on a third target object indicated by the fourth region using a camera corresponding to the first target control, and focusing on the first target object using a camera corresponding to the second target control.

19. The non-transitory readable storage medium according to claim 14, wherein the program or instructions are further executed by the processor to implement the following steps:

receiving a fifth input, wherein the fifth input is used for controlling a third target control in controls displayed in the first region to switch positions with the first target control in the second region; and in response to the fifth input, focusing on the first target object using a camera corresponding to the third target control.

* * * * *